March 9, 1965
C. F. WATERMAN
3,172,373
MIXING MACHINE ACCESSORY TABLE
Filed April 23, 1962
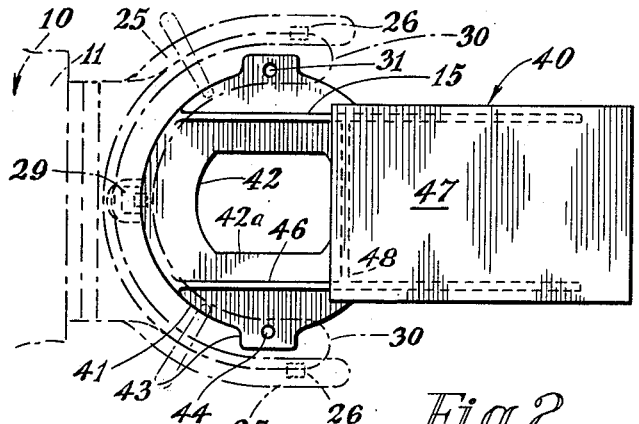
Fig. 2.
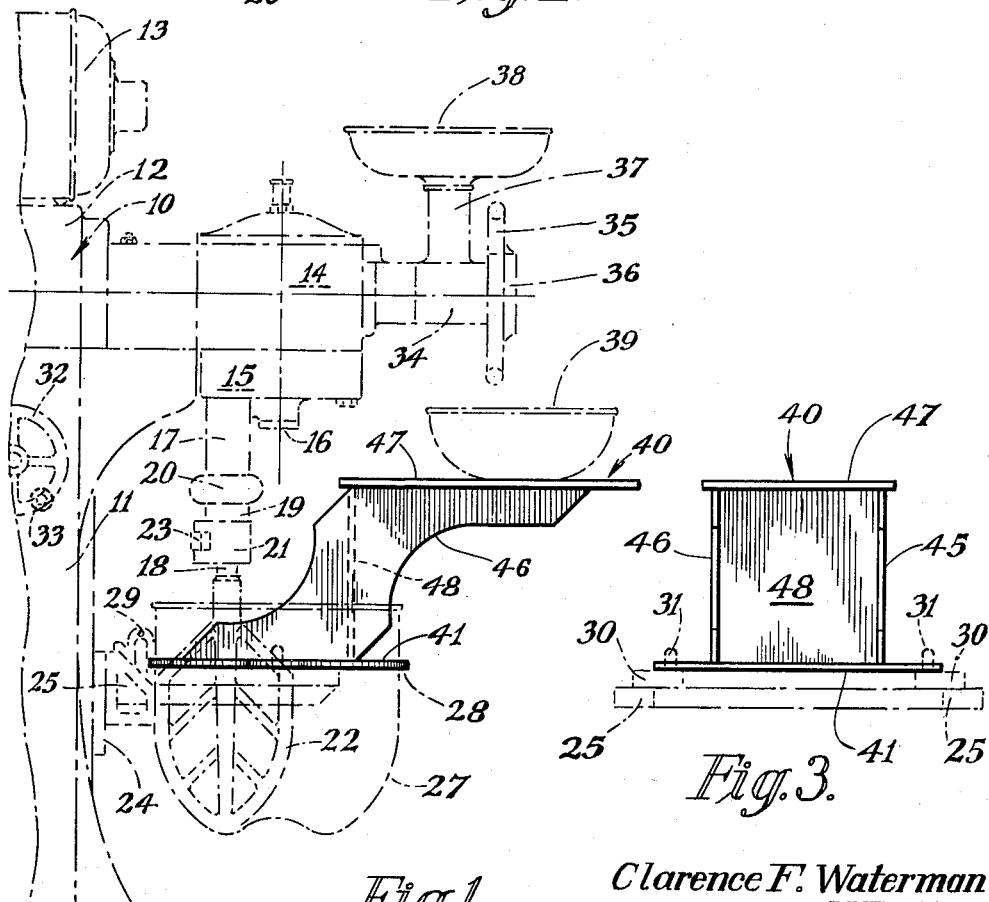
Fig. 1.
Fig. 3.
Clarence F. Waterman
INVENTOR.
BY James M. Clark
His Patent Attorney

United States Patent Office 3,172,373
Patented Mar. 9, 1965

3,172,373
MIXING MACHINE ACCESSORY TABLE
Clarence F. Waterman, Rte. 1, Box 353N,
West Palm Beach, Fla.
Filed Apr. 23, 1962, Ser. No. 189,382
2 Claims. (Cl. 108—42)

The present invention relates to improvements in mixing machines and more particularly to accessories and attachments for cake mixing and grinding machines of the type used by bakers and the like.

In the cake baking art it is customary to use mixing machines and combination mixing and grinding machines in which certain of the ingredients, such as flour and the like, are mixed within bowls of various capacities and certain of the other ingredients such as nuts, citron and other solids, are ground to the desired size in the grinding portion of the machine. In the more common types of machines used for these purposes the mixing is usually accomplished by a stirrer or paddle at the lower end of a rotatable vertical shaft, which may also oscillate, and the grinding is usually accomplished by a screw or worm and a grinding die at the end of a horizontal shaft disposed at an appreciable height above the aforementioned mixing bowl. Inasmuch as in many of such machines it is frequently inconvenient to support the smaller bowl for the ground ingredients from a suitable support upon the machine it is a principal object of the present invention to provide an improved accessory or attachment for such machines which is readily attached by the same means to which the mixing bowl is attached and which provides a cantilevered shelf or table upon which the ground material may drop, or upon which a small bowl or container may be supported. It is a further object to provide an improved accessory table of the type described which is of improved construction and design, to thereby provide a strong but relatively light device which is easily attached and removed, can be readily cleaned, and which is adapted to be made from a wide variety of materials. Other objects and advantages of the present invention will become apparent to those skilled in the art after the reading of the following description in conjunction with the attached drawings, in which:

FIGURE 1 is a fragmentary side elevation of a combined mixing and grinding machine shown in phantom lines to which a preferred form of the improved accessory table is attached and is shown in solid lines;

FIGURE 2 is a plan view of the same with the machine and the accessory table similarly indicated; and FIGURE 3 is a front elevation of the accessory table in full lines showing its relationship to the mixing bowl supporting yoke.

Referring now to the figures and more particularly FIGURE 1, the numeral 10 indicates a typical power-driven combination mixing and grinding machine having a main vertical framework or casing 11 to the upper portion of which is attached the gear case 12 and the electric motor 13. The framework 11 has a suitable base 11a by which the machine is supported upon, or anchored to, the floor or other foundation upon which it rests. A housing, or gear-box for the beater or stirrer actuating mechanism is shown at 14 mounted upon the casing 10 and transmitting power from a suitable horizontal shaft (not shown) through double sets of bevel gears (not shown) for the rotation of both the revolving casing 15 about the axis of the vertical shaft 16 as well as the rotation of the eccentric vertical tubular extension 17 of the revolving casing 15. In a manner well known in the art it will be understood that when the motor 13 is operated and the horizontal shaft within the casing 14 is driven thereby, the casing 15 will revolve slowly and the tubular housing portion 17 will revolve rapidly. To the latter there is suitably attached a socket member 19 for the beater shaft 18, the socket member having an inwardly turned flange 20 for engaging over the tubular portion 17. The socket member also has a hinged section 21 adapted to be opened to receive the squared end of the beater shaft 18 and is adapted when locked thereto by the latch member 23 to maintain the beater 22 in a uniform position or vertical height and properly centered so that the beater 22 in its rotation shall not strike the sides of the bowl 27. The latch member or lock 23, in addition to securing the beater paddle or stirrer 22, may also be used to secure other attachments.

Floor model machines of the type illustrated in FIGURE 1 are usually provided with at least two bowl sizes, such as of 20 quart and 40 quart capacities, and the smaller size bowl has been shown in FIGURE 1. The bowl 27 has a horizontal flange 28 which is suitably supported from the vertical guide or track 24 by the semi-circular frame or yoke 25 within which is supported the insert or adapter yoke 30 to receive the smaller capacity, and accordingly smaller diameter, bowl 27 which has been shown in FIGURE 1 by way of example. Suitable slots 26 are provided at the yoke or frame extremities to facilitate holding the yokes in proper position. The semi-circular frame 25 carries a suitable spring-pressed tongue or latch 29 which engages and retains the flange 28 of the bowl 27 (coincident with the base flange 41 of the improved table 40 to be more fully described below). The flange 28 of the bowl 27 has a pair of laterally and oppositely disposed holes which are engaged by the vertical pins 31 which further assist in securing the bowl to the supporting yokes 25–30 and hence to vertical rails 24.

The machine is provided with an elevating wheel 32 with a suitable handle 33 and it will be understood that rotation of the wheel will impart vertical movement to the semi-circular yoke members 25–30 along the guide rails 24 to accommodate the different size bowls and to raise or lower the same to the desired height. The mechanism by which this vertical movement is obtained may be either hydraulic, electrical, mechanical or a combination of the same, in a manner well known in the art, and in itself does not form a novel portion of the present invention. It will accordingly be understood that with the bowl 27 fastened in position and the motor 13 operating such that the casing 15 is caused to revolve slowly, the shaft 18 in the tubular portion 17 will revolve rapidly. The beater or stirrer 22 will rotate rapidly with the portion 17 and its shaft 18, and it will be noted that during the revolution of the tubular portion 17, the shaft 18 will revolve a number of times as controlled by the gear train (not shown) within the housing 14 by which it is operated. Thus the beater may not always return to the same position after one complete revolution but will traverse a large number of paths, as for example, over two hundred different paths in the arrangement shown in FIGURE 1.

The grinding operation of the machine is accomplished by the horizontal drive shaft (not shown) which extends through the gear-box housing 14 into the grinding worm housing 34 associated with the lock wheel 35 for the grinding worm and feeding through the grinder cutting die 36. The grinder worm is fed from the feed bowl or hopper 38 through the vertical feed shaft or tube 37 and the ground particles, after passing through the cutting die 36, drop into the bowl or dish 39, or such particles may drop directly upon the table 40.

My improved accessory table for the support of the bowl 39 is shown in each of the figures by the solid lines and shaded surfaces. The table comprises essentially two horizontal members, namely the bottom flange or base 41 and the top shelf 47 interconnected by the spaced vertical side plates 45 and 46 with all four of the elements tied together and braced by the central cross web 48. The base flange 41 is generally circular in outline with two opposed ears or lugs 43 suitably apertured at 44 to engage the vertical pins 31 carried by the yoke 30. The base plate 41 is apertured as at 42 with suitable arcuate ends and straight sides 42a parallel to the side plates 45 and 46, the aperture 42 permitting the beater to remain on the machine in an inoperative condition while the grinder table 40 is in use in the position previously occupied by the bowl 27. The top plate or shelf 47 may preferably be rectangular with its edges straight and parallel to the side plates 45 and 46 and the cross web 48. The side plates 45 and 46 are in effect cantilevered brackets such that the top shelf 47 is disposed considerably farther from the upright frame 11 of the machine than the base plate 41, such that they overlap each other to a sufficient extent to permit the provision of the central tie web 48 which also engages the full height of each side plate 45 and 46.

The improved accessory table 40 may be constructed of any suitable material such as metal, plastic, wood or other material and it may either be cast or formed as an integral unitary member or may be assembled from the individual plate or sheet elements suitably fastened together. In a preferred form it has been made from plywood with the hardwood outer laminations but when made in any suitable material it is light but sturdy, easy to keep clean, readily installed or removed, and very convenient to use. Since the base plate 41 is substantially the same peripheral shape and dimension as the flange 28 of the bowl 27, the table 40 and the bowl 27 are readily interchangeable and the catch 29 will secure either in operative position without tipping. By using the elevating mechanism controlled by the handwheel 32–33 the accessory table can be raised or lowered to the most convenient position to suit the size of the bowl 39 and the particular material being ground.

Other objects and advantages of the present invention as will become apparent to those skilled in the art are encompassed by the following claims.

I claim:

1. A releasable attachment comprising a base flange adapted for releasable attachment from an arcuate support, a table surface vertically spaced above and laterally spaced from said base flange and rigid tie elements fixedly connecting the said base flange to said table surface in a cantilevered relationship.

2. A releasable attachment of the type called for by claim 1 characterized by said base flange having a central opening therein to permit a rotatable element to clearingly pass therethrough, said base flange having a substantially circular periphery provided with a pair of oppositely extending apertured ears adapted for engagement with vertically extending pins carried by the arcuate support.

References Cited by the Examiner

UNITED STATES PATENTS

| 2,001,324 | 5/35 | Early | 248—235 X |
| 2,801,545 | 8/57 | Schottle | 64—30 |

FOREIGN PATENTS

| 519,468 | 5/53 | Belgium. |
| 731,786 | 6/55 | Great Britain. |

J. SPENCER OVERHOLSER, *Primary Examiner.*

EVERETT W. KIRBY, WILLIAM W. DYER, Jr.,
*Examiners.*